(12) United States Patent
Rao et al.

(10) Patent No.: US 9,953,652 B1
(45) Date of Patent: Apr. 24, 2018

(54) SELECTIVE GENERALIZATION OF SEARCH QUERIES

(71) Applicant: Amazon Technologies, Inc., Reno, NV (US)

(72) Inventors: Delip Rao, Seattle, WA (US); Christian Darrel Monson, Bellevue, WA (US); Alborz Geramifard, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/260,094

(22) Filed: Apr. 23, 2014

(51) Int. Cl.
*G10L 19/04* (2013.01)
*G10L 15/26* (2006.01)

(52) U.S. Cl.
CPC ............ *G10L 15/265* (2013.01); *G10L 19/04* (2013.01)

(58) Field of Classification Search
CPC .................................................... G10L 15/265
See application file for complete search history.

(56) References Cited

U.S. PATENT DOCUMENTS

| | | | |
|---|---|---|---|
| 8,650,031 B1* | 2/2014 | Mamou | G10L 15/08 704/2 |
| 9,418,177 B1* | 8/2016 | Lloyd | G10L 15/197 |
| 2006/0259467 A1* | 11/2006 | Westphal | G06F 17/30672 |
| 2011/0314010 A1* | 12/2011 | Ganti | G06F 17/30395 707/728 |
| 2015/0052020 A1* | 2/2015 | Raman | G06Q 30/0627 705/26.63 |

* cited by examiner

*Primary Examiner* — Ibrahim Siddo
(74) *Attorney, Agent, or Firm* — Knobbe, Martens, Olson & Bear, LLP (57) ABSTRACT

Features are disclosed for processing user queries into a form that can produce relevant results. Spoken user queries can be transcribed into textual queries. Textual queries can be processed using a statistical model to identify entities within the queries. Running searches using the entities rather than the original search query can produce relevant results even when no result would have been obtained by running the original search query. In some embodiments, attributes may be identified and used during the search to narrow the results and potentially produce results that are more relevant.

25 Claims, 5 Drawing Sheets

SELECTIVE GENERALIZATION OF SEARCH QUERIES

BACKGROUND

Speech processing systems include various modules and components for receiving spoken input from a user and determining what the user meant. In some implementations, a speech processing system includes an automatic speech recognition ("ASR") module that receives audio input of a user utterance and generates one or more likely transcriptions (e.g., recognition results generated by the ASR module) of the utterance. ASR modules typically use an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken.

Speech processing systems can use the transcriptions generated by the ASR module in various ways. For example, some speech processing systems simply fill in a form field or otherwise save the transcription of the user utterance. As another example, some speech processing systems may include modules or components that accept a transcription of a user utterance and determine the meaning of the utterance in a way that can be acted upon, such as by a computer application. One example of such a module is a natural language understanding ("NLU") model. To facilitate the interpretation of the utterance, the NLU module can classify elements of textual input in various pre-defined categories using a process known as named entity recognition. Examples of categories or types of named entities include the names of persons, organizations, locations, expressions of times, quantities, monetary values, and the like.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to searching a catalog and returning relevant results in response to highly-specific or otherwise over-specified spoken queries, even when there may not be any items in the catalog that completely satisfy the search queries. In order to provide such benefits, search queries can be selectively generalized in order to return relevant results, rather than simply generalized in order to return additional results which may or may not be relevant. In some embodiments, the selective generalization can be performed using an entity detection or recognition model that is based primarily or exclusively on a statistical analysis of prior search queries, rather than a model that is based primarily or exclusively on data in the catalog to be searched.

Conventional search systems typically search a catalog or other data store for records or items that match submitted queries. If a query is too specific or otherwise "noisy" (e.g., the query includes too many search terms, conflicting search terms, extraneous words or phrases, etc., or the recognition results produced by an automatic speech recognition module include misrecognitions), then no item in the database may satisfy the query in its entirety. For example, a grocery store may provide a search interface for searching its catalog of products. If a user submits a query that is over-specified or that includes extraneous terms (e.g., "I'd like to search for organic fair trade dark roasted Ethiopian coffee with vanilla flavor"), then no single product in the catalog may satisfy the query completely and the search may not return any results. If a user submits a query that includes conflicting terms (e.g., "lemons and limes"), then no single product may satisfy the query completely (even though individually, the terms "lemons" and "limes" are very broad terms that almost certainly match items in a grocery store's catalog of products). In these cases, no results may be returned. In some cases, irrelevant products may be returned in response to such queries (e.g., lemon-lime flavored drinks).

Some search systems attempt to solve the "noisy" query problem by returning results that match some subset of terms in a query, such as every term in the query except one (or two, or three, etc.), or any single term in the query (or any two terms, or three terms, etc.). Although these search systems may return at least some results for most search queries, the results may not be relevant. For example, the query "I'd like to search for "organic fair trade dark roasted Ethiopian coffee with vanilla flavor" may return results including coffee flavored ice cream, organic vanilla, etc., due to the matching of individual terms or combinations of terms. However, such a search may fail to return an actual coffee item as one of the top results if, e.g., no coffee item matched more than two terms. Such irrelevant results may frustrate users.

Aspects of the present disclosure relate to selectively generalizing queries in order to obtain relevant results from over-specified or otherwise "noisy" queries. Rather than running a search using all search terms in a noisy query and potentially getting no relevant results, a subset of terms (e.g., one or more terms) can be identified and used to run the search. In addition, rather than simply returning results which match any subset of search terms, the particular subset of search terms that are to be matched can be intelligently selected based upon some criteria to improve the quality and relevance of the search results. For example, particular words or phrases in a search can be identified as "entities" in a process that may be referred to as "entity detection." In entity detection, tokens that correspond to the subject of the query (e.g., nouns) are determined to be entities and are discriminated from non-entities in query text. Illustratively, entity detection may identify "potatoes" as the only entity in the text "extra-large baking potatoes." Searching a catalog for items which match detected entities provide at least some results when the original query yields no results (known as a "null query"). Returning to the example above, the query "I'd like to search for organic fair trade dark roasted Ethiopian coffee with vanilla flavor" may be a null query. However, it is apparent that the query is for coffee (or, more specifically, for Ethiopian coffee) with certain attributes. By detecting the entity "coffee" (or "Ethiopian coffee") and using that detected entity to search the catalog, results may be returned which provide the user with relevant offerings for coffee even though no single product matches every term of the original query.

Additional aspects of the present disclosure relate to selective generalization of queries by categorizing entities and, in some cases, also detecting particular attributes associated with the categorized entities. The search can then be run using the specific category of the identified entities as an additional search criterion. The entities may be categorized in a process known as "named entity recognition," or more simply as "entity recognition." Entity recognition, in contrast to entity detection, goes beyond detecting the presence of entities in a text, but rather identifies the categories of those entities. Illustratively, a query for "extra-large baking potatoes" would be transformed not just into a query for "potatoes" generally, but could instead be transformed into a query for items of type "produce" with a name matching or related to "potatoes" (e.g., "term=potatoes; category=produce"), resulting in a more informative query. In addition to searching for named entities of a particular category (e.g., "produce"), specific attributes may be added to the search in order to further limit the query. For example, the term "baking" may be identified as an attribute of certain types of potatoes. The query could then be run for named entities in the produce category matching "potatoes" and also associated with the attribute "baking." Results for such a search may be limited to baking potatoes, or may include baking potatoes as a top result.

Further aspects of the present disclosure relate to methods of training models for use in selective generalization of queries. The models may be trained using weakly supervised training data based on actual queries relevant to the catalog to be searched using the model. For example, prior queries for groceries may be used to generate weakly supervised training data for training a model to be used by a grocery searching application. The model may be any type of statistical structure prediction model that can be used to detect entities and/or recognize entities in input text, such as a conditional random field ("CRF") model.

Although aspects of the embodiments described in the disclosure will focus, for the purpose of illustration, on selective generalization of spoken search query transcriptions generated by automatic speech recognition ("ASR") systems, those skilled in the art will appreciate that the techniques disclosed herein may be applied to any number of software processes or applications performing searches. For example, queries may be submitted as text rather than as spoken utterances, such as search queries typed into a search field in a graphical user interface. In addition, although aspects of the embodiments described herein will focus, for the purpose of illustration, on a network-based search processing system that processes search queries received from multiple individual user devices, those skilled in the art will appreciate that the selective searching methods described herein may be implemented within a user device such that the user device itself can perform some or all of the selective generalization and searching described herein. Various aspects of the disclosure will now be described with regard to certain examples and embodiments, which are intended to illustrate but not limit the disclosure.

Examples of Search Processing Systems

Figure 1:
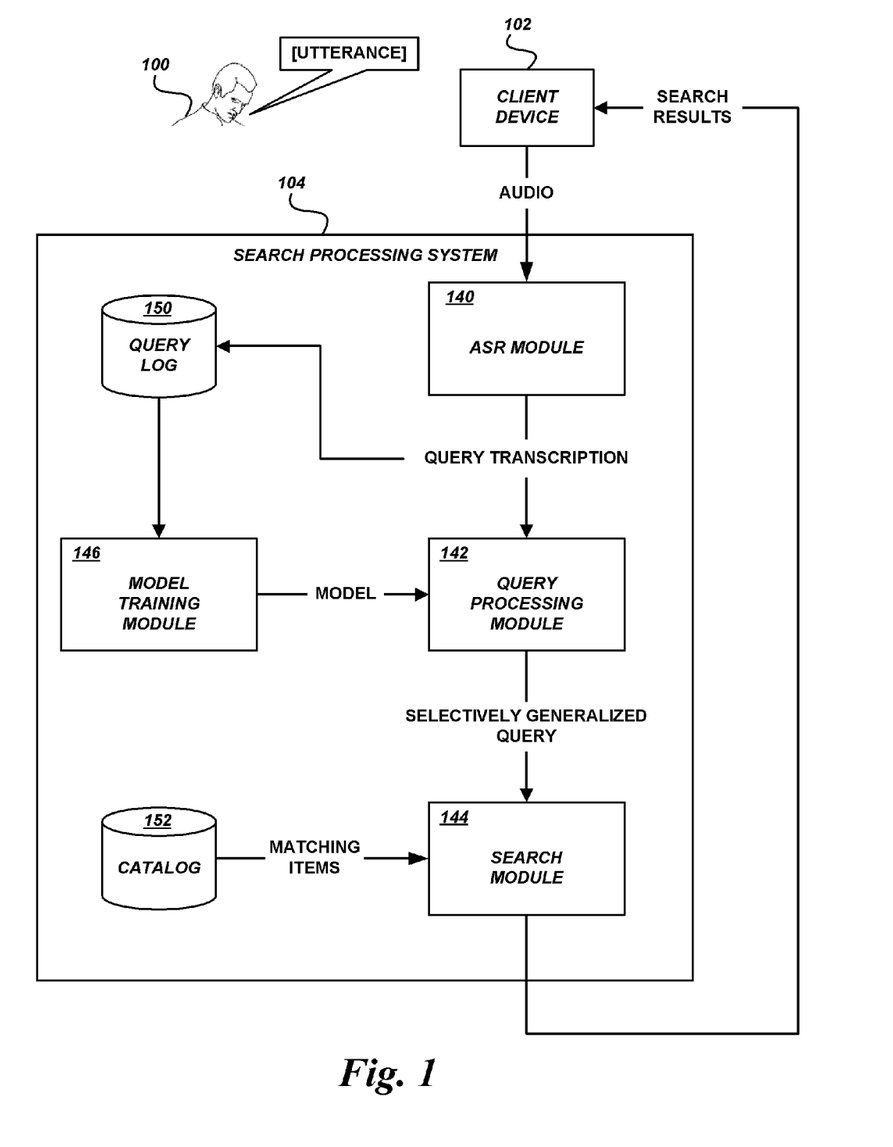
FIG. 1 is a block diagram of illustrative data flows between modules of a search processing system configured to process spoken queries and execute the queries against one or more catalogs according to some embodiments.

With reference to an illustrative embodiment, FIG. 1 shows a computing environment that may implement aspects of the present disclosure. In particular, FIG. 1 shows example data flows between various speech and search processing modules in response to receipt of spoken search queries. A user 100 may make an utterance, such as a spoken search query for "organic fair trade dark roasted Ethiopian coffee with vanilla flavor." The user 100 may speak the utterance into (or in the presence of) some client device 102 operated by the user 100.

The client device 102 can correspond to a wide variety of electronic devices. In some embodiments, the client device 102 may be a computing device that includes one or more processors and a memory which may contain software applications executed by the processors. The client device 102 may include or be in communication with an audio input component for accepting speech input on which to perform speech recognition, such as a microphone. The client device 102 may also include or be in communication with an output component for presenting responses or other information from the search processing system 104, such as a monitor or a speaker. The software of the client device 102 may include hardware components and/or software for establishing communications over wireless communication networks or directly with other computing devices. Illustratively, the client device 102 may be a mobile device, such as a mobile phone, personal digital assistant ("PDA"), mobile gaming device, media player, electronic book reader, tablet computer, laptop computer, or the like. In some embodiments, the client device may be a substantially stationary device, such as a television with program execution capabilities and network connectivity (a "smart TV"), set-top box, gaming console, home entertainment system, desktop computer, server computer, or the like.

As shown in FIG. 1, user utterances may be provided to a search processing system 104. The search processing system 104 can be a network-accessible system in communication with the client device 102 via a communication network, such as a cellular telephone network or the Internet. A user 100 may use the client device 102 to submit searches, receive information, and initiate various processes, either on the client device 102 or at the search processing system 104.

The search processing system 102 may include an ASR module 140 that performs automatic speech recognition on audio data regarding user utterances, a query processing module 142 that processes ASR output (e.g., transcripts) into queries, and a search module 144 that executes the queries to perform the requested searches on a catalog 152. In some embodiments, the search processing system 102 may include or be associated with a model training module 146 that generates training data from a query log 150 and trains a model for use by the query processing module 142.

The search processing system 104 may include any number of server computing devices, desktop computing devices, mainframe computers, and the like. Each individual device may implement one of the modules or components of the search processing system 104. In some embodiments, the search processing system 104 can include several devices physically or logically grouped together to implement one of the modules or components of the search processing system 104. For example, the search processing system 104 can include various modules and components combined on a single device, multiple instances of a single module or component, etc. In one specific, non-limiting embodiment, the search processing system 104 may include a server or group of servers configured with ASR modules 140, a server or group of servers configured with query processing modules 142, a server or group of servers configured with search modules 144, a server or group of servers with some combination of modules and/or data stores, etc. In multi-device implementations, the various devices of the search processing system 104 may communicate via an internal communication network, such as a corporate or university network configured as a local area network ("LAN") or a wide area network ("WAN"). In some cases, the devices of the search processing system 104 may communicate over an external network, such as the Internet, or a combination of internal and external networks.

In some embodiments, the features and services provided by the search processing system 104 may be implemented as web services consumable via a communication network. In further embodiments, the search processing system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the features of the search processing system 104 may be integrated into the client device 102 such that network connection and one or more separate computing systems are not necessary to perform some or all of the processes of the present disclosure. For example, a single client device 102 may include the ASR module 140, the query processing module 142, the search module 144, the catalog 152, or some combination thereof.

Returning to the examples described above and in greater detail below, a user may make an utterance, such as a spoken search query, to a client device 102. A microphone may capture utterance audio and provide it (or data derived therefrom) to the search processing system 104. The ASR module 140 may generate ASR results for the utterance, such as an n-best list of recognitions, also referred to herein as "transcriptions." Each transcription or portion thereof may be associated with some score, such as a confidence score or a likelihood that the transcription or portion thereof is correct. The n-best list or some other type of results may be provided (directly or indirectly) to the query processing module 142.

The query processing module 142 can process the top-scoring transcript or multiple transcripts from the ASR results in order to generate search terms for use by the search module 144. In some embodiments, as described in greater detail below with respect to FIGS. 2 and 4, the query processing module 142 may generate a subset of entities (e.g., one or more entities) identified using entity detection. The subset of entities may be provided to the search module 144, which can search the catalog 152 for items which match the subset of entities, or for items which match one or more of the subset of entities. For example, the query "search for lemons and limes" includes two entities: (1) lemons, and (2) limes. The catalog 152 can be searched for either lemons or limes, or it may be searched for both lemons and limes. In the multi-entity search instance, items may be returned which match each of the multiple entities, match only one of the multiple entities, or some range of options in between. Illustratively, when the catalog 152 is searched for both lemons and limes, results may be returned which include items matching only lemons and items matching only limes.

As used herein, the term "match" in the context of searching is not limited to items having literal textual matches with search terms. Rather, the term "match" is intended to take its ordinary and customary meaning with respect to searching. For example, some implementations use search terms as roots and automatically expand them by returning items which match the plural, possessive, or other grammatical form of the term. As another example, some implementations automatically expand searches for certain terms to include alternate spellings, synonyms, and the like. Such implementations are within the scope of the present disclosure, and one of skill in the art will appreciate that the techniques described herein can apply to any number of additional or alternative implementations.

In some embodiments, as described in greater detail below with respect to FIGS. 3 and 4, the query processing module 142 may generate a subset of entities (e.g., one or more) identified using entity recognition. The subset of entities may be provided to the search module 144, which can search the catalog 152 for items which match the subset of entities on a categorical basis in addition to a textual basis. In additional embodiments, the query processing module 142 may generate a subset of attributes (e.g., one or more) associated with the recognized entities. The attributes may be used to narrow the search in order to produce relevant results, without unnecessarily limiting the results to only those which match every search term in the query.

The query processing module 142 may use a structure prediction model to detect entities in a transcript of a query. In some embodiments, the model may be any Bayesian network (e.g., a tree prediction model such as a dependency parser; a sequential prediction model such as a CRF model, hidden Markov model, or maximum entropy Markov model; etc.). The model may be trained using data regarding prior queries processed by the search processing system 104 or by some other system. For example, each query submitted to the search processing system 104 (or some subset thereof) may be stored in a query log 150. As described in greater detail below with respect to FIG. 5, the model training module may use the query log 150 to generate weakly supervised training data in order to train the model used by the query processing module 142.

Figure 2:
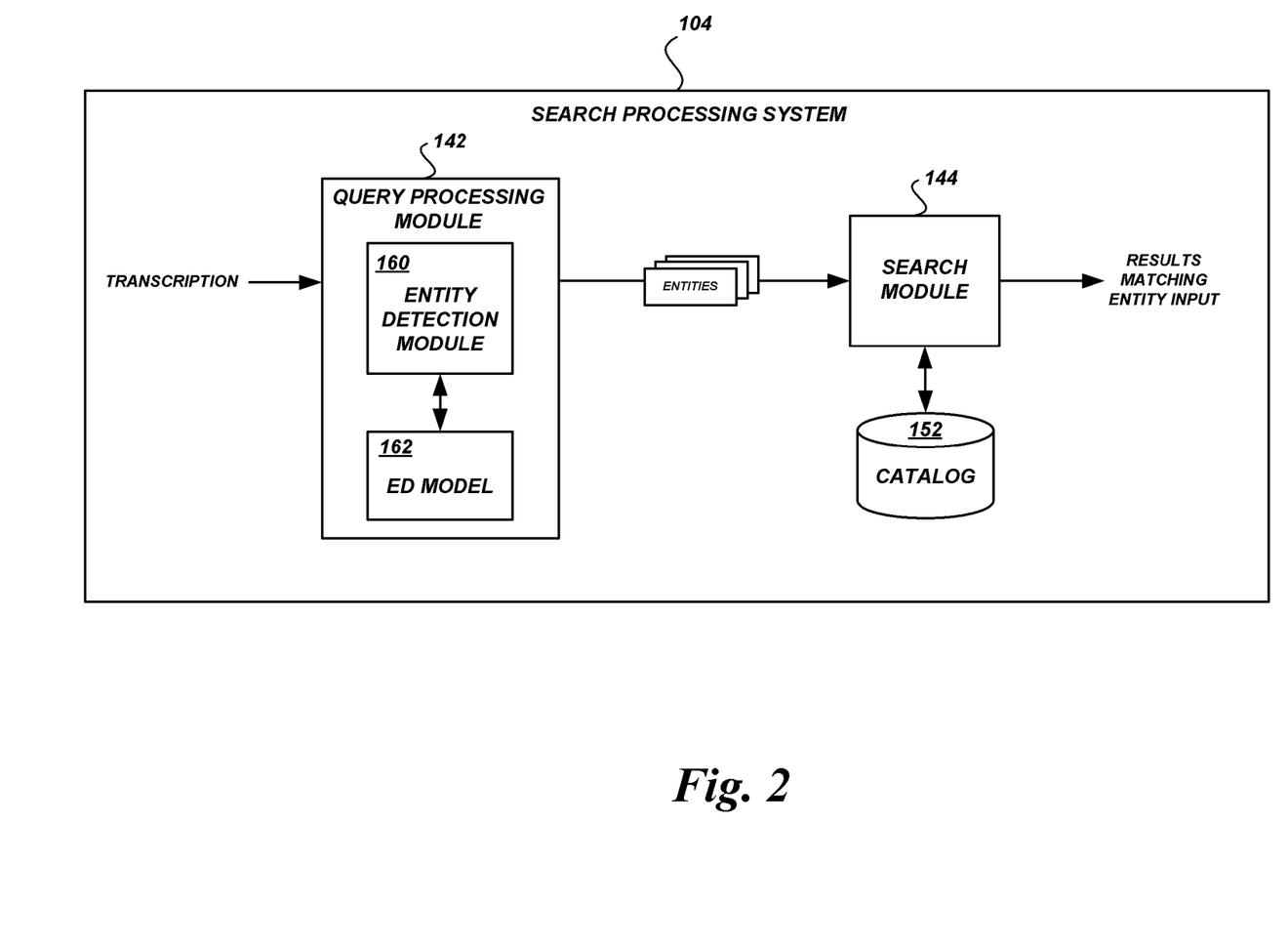
FIG. 2 is a block diagram of illustrative data flows between modules of a search processing system using entity detection to process spoken queries according to some embodiments.

FIG. 2 shows an embodiment of query processing module 142 configured to perform entity detection on query transcripts and to provide one or more entities to the search module 144 for searching. The query processing module 142 shown in FIG. 2 includes an entity detection module 160. The entity detection module 160 may include or otherwise have access to a model 162, such as an entity detection ("ED") model, that can be used to detect individual entities in a query transcript. Illustratively, the model 162 may take some set of features as input and produce, for a given token, output that can be used to determine entity boundaries for any entity that may be present in the query. This output can be used to segment the query into entities and non-entities. The input features may include data such as the current token, contextual features (e.g., the left-contextual token, the right-contextual token), boundary features (e.g., whether the token was at the beginning or end of the sequence), gazetteer match features (e.g., whether there is a token in the entity lexicon that matches the current token), and the like. In some embodiments, the output may include marked-up transcriptions, such as transcriptions marked up using "BIO" notation.

Figure 4:
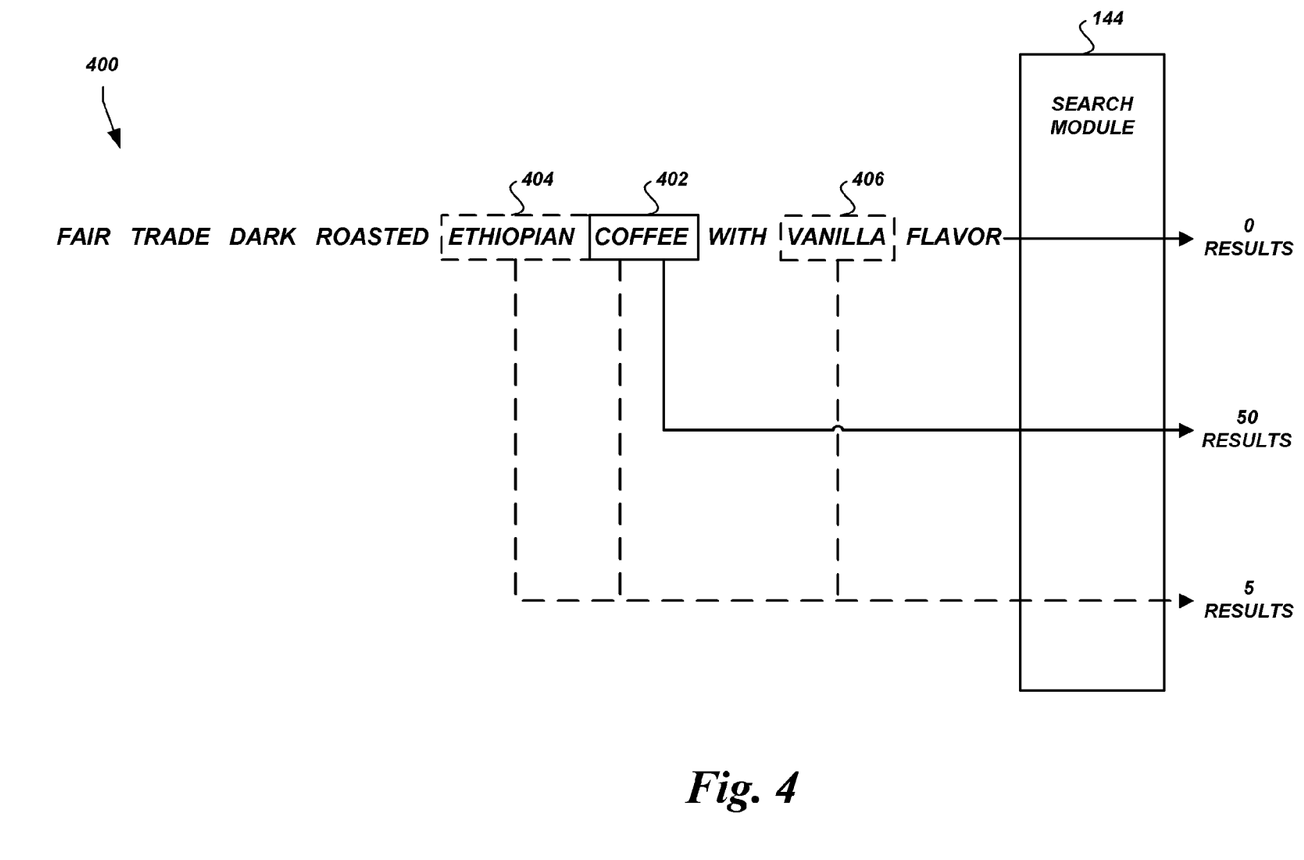
FIG. 4 is a diagram of an illustrative spoken query and examples of processing the query according to some embodiments.

FIG. 4 shows an example query transcription 400 and several examples of query processing module 142 output. The query transcription is a sequence of nine tokens: "fair trade dark roasted Ethiopian coffee with vanilla flavor." As shown, a search run with the entire sequence may not return any results if the system requires each search term to be matched in the results. However, by selectively generalizing the search, search results may be obtained for this otherwise null query. Moreover, because the generalization is selective and is based on entity detection rather than simply matching any subset of terms in the sequence, the results can be relevant to the search. Illustratively, the query processing module 142 can detect that the only entity 402 in the transcription is the term "coffee," or the query processing module 142 can produce an n-best list of possible entities (e.g., ranked by confidence or some other score) that includes "coffee" and other terms, such as "vanilla." The query processing module 142 can provide the detected entity or n-best list 402 to the search module 144. The search module 144 can search the catalog 152 using a single entity received from the query processing module 142, a highest-scoring entity from the n-best list, multiple entities from the n-best list, etc. In the illustrated example, the search module 144 can search for "coffee" and return 50 results, rather than the 0 results that would have been returned from running the original noisy query. In some embodiments, the search module 144 may first run the original query, and then run the processed query upon determining that the results are unsatisfactory (e.g., upon determining that the original query is a null query).

The nature of spoken language interfaces may encourage users to submit search queries that include additional noise not normally included in typed queries. For example, a user may initiate a search similar to the search shown in FIG. 4 by uttering "I'd like to search for organic fair trade dark roasted Ethiopian coffee with vanilla flavor please." In this example, even if there were results that matched each term in the original query shown in FIG. 4, the additional noise (e.g., "I'd like to," "please") may cause the search to return no results. By excluding the noisy portions of the query, relevant results may be found and returned to the user. Such noisy portions of the query can be excluded by using the entity detection techniques described above. As long as the entity detection model used to process the query does not recognize "I'd," "like," "to," or "please" as entities, those tokens can be excluded from the search.

Figure 3:
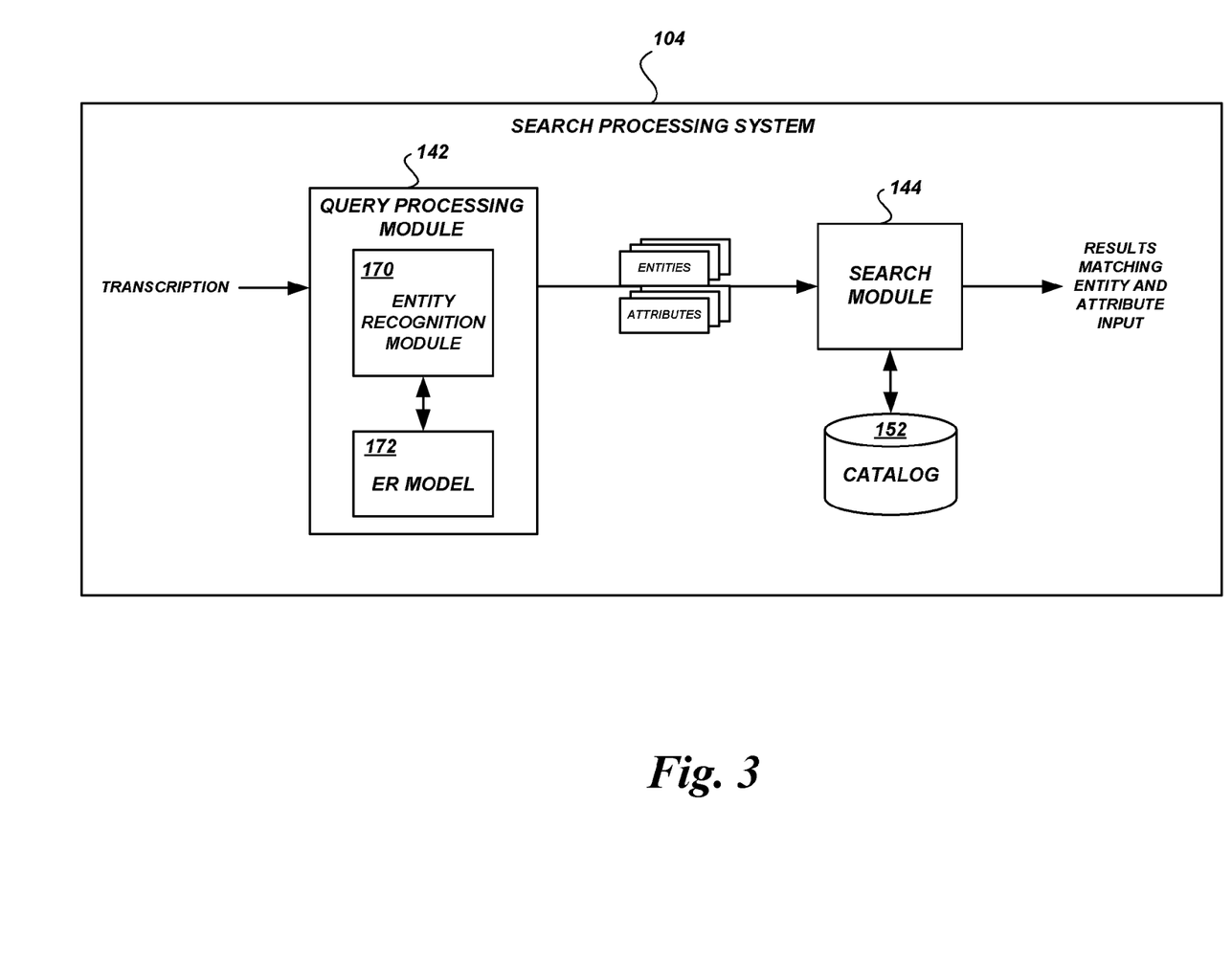
FIG. 3 is a block diagram of illustrative data flows between modules of a search processing system using entity recognition to process spoken queries according to some embodiments.

FIG. 3 shows an embodiment of query processing module 142 configured to perform entity recognition on query transcripts and to provide one or more entities and corresponding attributes to the search module 144 for searching. The query processing module 142 shown in FIG. 3 includes an entity recognition module 170. The entity recognition module 170 may include or otherwise have access to a model 172, such as an entity recognition ("ER") model, that can be used to detect and recognize individual entities in a query transcript. Illustratively, the model 172 may take some set of features as input and produce, for a given token, output that can be used to determine entity and attribute boundaries for any entity or attribute that may be present in the query. This output can be used to segment the query into entities, attributes, and other tokens. The input features may be similar or identical in many respects to the input described above with respect to FIG. 2.

FIG. 4 shows an example query transcription and an example of query processing module 142 output based on the entity recognition module 170 described above. By selectively generalizing the search using named entities and one or more associated attributes, search results may be obtained for this otherwise null query. Moreover, because attributes are used in addition to the entity, the generalization produced by the query processing module 142 of FIG. 4 generates more targeted search results than were produced by output from the entity detection implementation. Illustratively, the query processing module 142 can detect that the only entity 402 in the transcription is the term "coffee," or the query processing module 142 can produce an n-best list of entities as described above with respect to FIG. 2. In the present example, the entity that is provided to the search module 144 may be a named entity of type "beverage." By recognizing the specific category of the entity, more targeted searching can be performed. For example, the catalog 152 can be searched for only items categorized as "beverage" which also match the term "coffee," rather than any item in the catalog which matches the term "coffee."

In addition, the query processing module 142 can identify one or more attributes 404, 406 in a given token sequence (e.g., an n-best of attributes, similar to the n-best list of entities described above). Illustratively, the query processing module 142 may identify attributes "Ethiopian" and "vanilla" as being attributes 404 and 406 respectively that are associated with coffee in particular or with beverages generally. By identifying such attributes, even more targeted searching can be performed than with a named entity alone. For example, the catalog can be searched for only items in the "beverage" category that match "coffee" and that also match (or are otherwise associated with) the attributes "Ethiopian" and "vanilla." This processed search query can return results that are even more relevant to the originally submitted search string than general "coffee" items, providing users with potentially interesting search results when there may have been no search results for the originally submitted search.

Process for Training Query Processing Models

Figure 5:
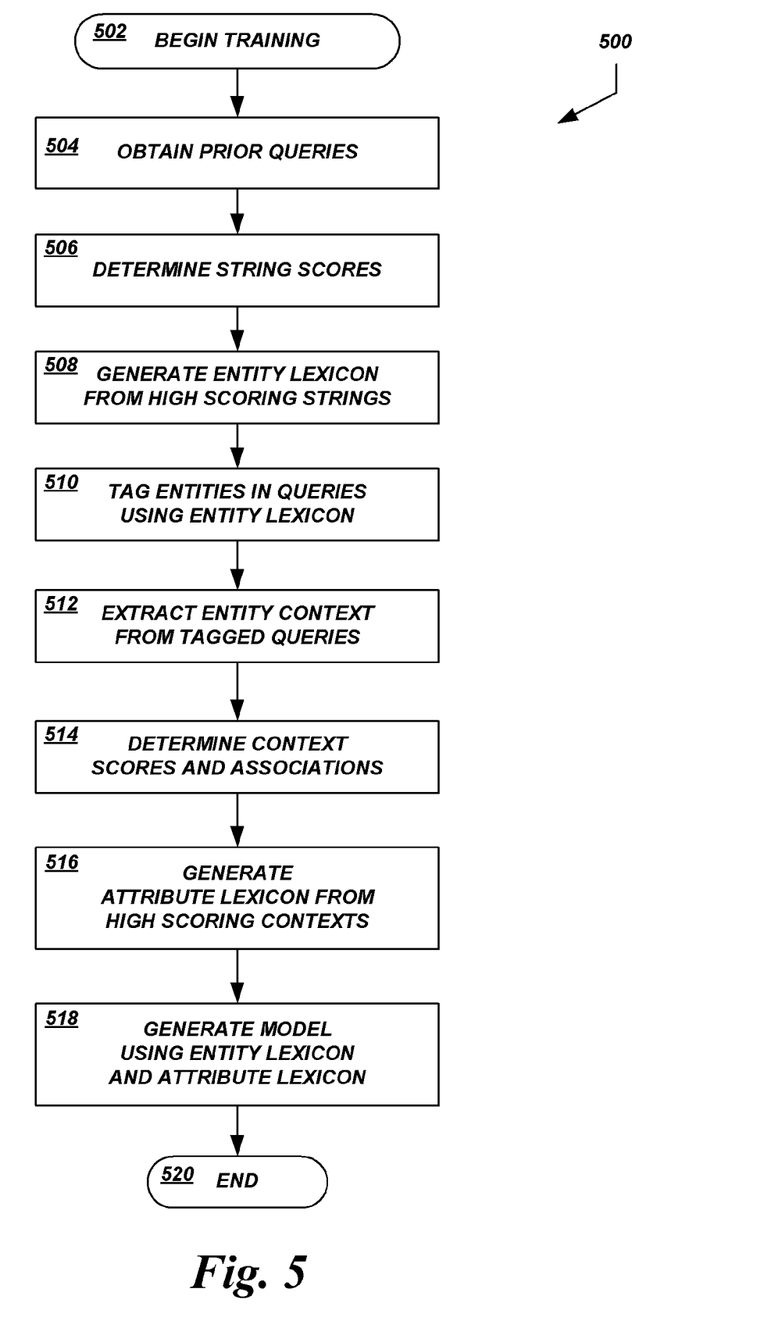
FIG. 5 is a diagram of an illustrative process for training a model for use in processing spoken queries according to some embodiments.

With reference now to FIG. 5, a sample process 500 for training an entity recognition model for use by a query processing module 142, such as those described above, will be described. Advantageously, a model training module 146 may perform the process 500 using weakly supervised data based on actual queries. This can save considerable time, effort, and expense when compared with using human-annotated or other more closely supervised training data. Although the weakly supervised training data may be noisy, the large volume of training data can help alleviate some or all of the shortcomings attributable to the noisiness.

The process 500 begins at block 502. The process 500 may begin automatically upon receipt of some threshold number of queries, on some predetermined or dynamically determined schedule, on-demand by a user or administrator of the search processing system 104, or in response to some event. The process 500 may be embodied in a set of executable program instructions stored on a computer-readable medium, such as one or more disk drives, of a computing system of the search processing system 104. When the process 500 is initiated, the executable program instructions can be loaded into memory, such as RAM, and executed by one or more processors of the computing system.

At block 504, the model training module 146 or some other module or component can obtain prior search queries. The prior search queries may be obtained from a query log 150 that stores queries submitted to the search processing system 104. In some embodiments, the prior search queries may be obtained from some other source or system.

At block 506, the model training module 146 or some other module or component can determine scores for some or all of the strings in the query log data. The scores may be used to indicate which strings are entities (or are likely to be entities). The scores can be based on various factors, such as the frequency with which a string occurs in the query log data, the length of the string, information regarding the number of times the string was "clicked" or otherwise chosen in a particular system, some combination thereof, etc. In some embodiments, scores for individual words, pairs of words, or any n-gram (where n is some positive number) can be calculated. For example, when analyzing a query for "fair trade dark roasted Ethiopian coffee with vanilla flavor," the frequency counters for each of the nine individual words can be incremented, the frequency counters for the bigrams "fair trade," "trade dark," etc. can each be incremented, and so on. Scores for each individual n-gram may be calculated using this data.

At block 508, the model training module 146 or some other module or component can generate an entity lexicon from some or all high scoring strings identified above. Illustratively, if the score for the string "coffee" exceeds some threshold or is within the top x scores (where x is some positive number or percentage), then the string "coffee" can be added to the entity lexicon. In this example, the number of people who have submitted queries consisting only of "coffee" may be significant enough to indicate that "coffee" is an entity. As another example, the number of people who have submitted queries consisting of "Ethiopian coffee" may be substantially lower than the number that have submitted queries for only "coffee." However, due to the length of the string "Ethiopian coffee," the corresponding score may be high enough to include it in the entity lexicon even if other strings (e.g., shorter strings) with similar frequencies do not have high enough scores to be included in the entity lexicon. As another example, if the score for the string "fair trade dark roasted Ethiopian coffee with vanilla flavor" does not exceed some threshold or is not within the top x scores, then the string "fair trade dark roasted Ethiopian coffee with vanilla flavor" may not be added to the entity lexicon. In this example, the number of people submitting queries consisting of that particular string may be so low that its score indicates it is not an entity even though the string is quite long.

The technique described above may result in strings being added to the entity lexicon that are not necessarily entities. However, because of the volume of training data, subsequent steps of the model training process 500, and the use of the model to process queries, some level of "noisiness" is acceptable.

At block 510, the model training module 146 or some other module or component can tag entities within individual queries in the query log 150 using the entity lexicon generated above. For example, the model training module 146 may proceed query-by-query though the query log 150 (or though some subset of queries in the query log 150, or through some other corpus of data) and mark each entity. If a particular string segment in a query matches multiple entities in the entity lexicon, then the longest portion of the query that includes the particular string segment and matches an entity in the entity lexicon may be tagged as an entity. In some embodiments, the particular string segment may be tagged as multiple entities.

At block 512, the model training module 146 or some other module or component can extract entity context from the tagged/labelled queries generated above. For example, one or more words to the left of the entity may be extracted as the left context, one or more words to the right of the entity may be extracted as the right context, etc.

At block 514, the model training module 146 or some other module or component can determine context scores for the contexts extracted above. For example, the model training module 146 may base context scores on frequency and/or length, as described above with respect to entities, or the model training module 146 may use some other appropriate technique.

At block 516, the model training module 146 or some other module or component can generate an attribute lexicon using the high scoring contexts determined above. For example, the model training module 146 may select contextual words or phrases within the top x scores as described above with respect to entity scores, or the model training module 146 may use some other appropriate technique. The attributes may be general attributes (e.g., attributes that may apply to any product or some large subset of products, such as "organic" or "extra-large"). In some cases, attributes may be item-specific attributes or otherwise associated with particular items or small subsets thereof (e.g., "decaffeinated").

At block 518, the model training module 146 or some other module or component can generate a model using the entity and attribute lexicons.

At block 520, the process 500 may terminate or transition to another process.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory, wherein the one or more processors are programmed by the executable instructions to at least:
      obtain audio data regarding an utterance of a user, wherein the utterance comprises a new search query to search a catalog;
      generate a transcription of at least a portion of the utterance using the audio data and an automatic speech recognition module, wherein the transcription comprises a sequence of tokens corresponding to at least a portion of the new search query;
      identify a first subset of the sequence of tokens as a reference to an entity in the transcription based at least partly on a first frequency with which the first subset occurs in a plurality of previously generated transcriptions, wherein individual transcriptions of the plurality of previously generated transcriptions comprise search queries;
      identify a second subset of the sequence of tokens as a reference to an attribute of the entity in the transcription based at least partly on a second frequency with which the second subset occurs with the first subset in the plurality of previously generated transcriptions, wherein the second subset occurring with the first subset comprises the second subset and first subset both occurring in a same transcription of the plurality of previously generated transcriptions;
      generate search terms using the reference to the entity and the reference to the attribute, wherein the search terms include the first subset and second subset, and wherein the search terms exclude a third subset of the sequence of tokens; and
      generate search results responsive to the search query by identifying an item in the catalog using the search terms, wherein the catalog indicates the item comprises an instance of the entity having the attribute.

2. The system of claim 1, wherein the one or more processors are further programmed by the executable instructions to generate a structure prediction model using weakly supervised training data, wherein the structure prediction model comprises a conditional random field model, a hidden Markov model, or a maximum entropy Markov model.

3. The system of claim 1, wherein the one or more processors are further programmed to identify the item using the search terms in response to receiving no search results from executing a previous search using the new search query.

4. The system of claim 1, wherein the one or more processors are programmed to identify the plurality of attributes based at least partly on context in which entities are identified within the previously submitted queries.

5. A computer-implemented method comprising:
under control of one or more computing devices configured with specific computer-executable instructions,
generating a transcription of at least a portion of an utterance, wherein the transcription comprises a sequence of tokens corresponding to at least a portion of a search query;
identifying a first subset of the sequence of tokens as a reference to an entity in the transcription based at least partly on a first frequency with which at least a first token of the first subset occurs in a plurality of previously submitted search queries;
identifying a second subset of the sequence of tokens as a reference to an attribute of the entity in the transcription based at least partly on a second frequency with which at least a second token of the second subset occurs with the first token in the plurality of previously submitted search queries, wherein the second token occurring with the first token comprises the second token and first token both occurring in a same search query of the plurality of previously submitted search queries;
generating search terms using the reference to the entity and the reference to the attribute, wherein the search terms include the first subset and second subset, and wherein the search terms exclude a third subset of the sequence of tokens; and
generating search results responsive to the search query by identifying an item in a product catalog using the search terms, wherein the product catalog indicates the item comprises an instance of the entity having the attribute.

6. The computer-implemented method of claim 5, wherein the identifying the first subset comprises using a statistical model, and wherein the statistical model comprises a conditional random field model, a hidden Markov model, a maximum entropy Markov model, a structure prediction model, or a sequential model.

7. The computer-implemented method of claim 5, wherein generating the search results using the search terms is performed in response to determining that searching the product catalog using the search query returns no results.

8. The computer-implemented method of claim 5, wherein the entity comprises a named entity, and wherein the item identified in the product catalog is associated with a category corresponding to the named entity.

9. The computer-implemented method of claim 6, further comprising generating the statistical model using weakly supervised training data, wherein the weakly supervised training data is based at least partly on an automated analysis of previously submitted search queries to identify entities in the previously submitted search queries.

10. The computer-implemented method of claim 9, wherein the automated analysis comprises generating scores for each of a plurality of strings in the previously submitted search queries.

11. The computer-implemented method of claim 10, wherein a score for a string of the plurality of strings is based at least partly on at least one of: a frequency with which the string occurs in the previously submitted search queries; a length of the string; or a frequency with which the string is selected by users of a system associated with the product catalog.

12. The computer-implemented method of claim 9, wherein the automated analysis further comprises identifying a plurality of attributes in the previously submitted search queries based at least partly on frequencies with which tokens occur in the previously submitted search queries.

13. The computer-implemented method of claim 12, wherein identifying the plurality of attributes is further based at least partly on context in which entities are identified within the previously submitted queries.

14. The computer-implemented method of claim 5, wherein the entity comprises a highest-scoring entity of an n-best list of entities.

15. The computer-implemented method of claim 5, wherein identifying the second subset as the reference to the attribute comprises using a statistical model to process information regarding a location of a token relative to another token within the transcription.

16. The computer-implemented method of claim 5, wherein at least one of the first subset and the second subset comprises a plurality of tokens.

17. The computer-implemented method of claim 5, wherein the first frequency is a frequency with which a plurality of tokens of the first subset occur together in individual search queries of the plurality of previously submitted search queries.

18. The computer-implemented method of claim 5, wherein the second frequency is based on a number of search queries, of the plurality of previously submitted search queries, include both the first token and the second token.

19. The computer-implemented method of claim 5, further comprising generating a score based at least partly on the first frequency and a number of tokens in the first subset, wherein the identifying the first subset as the reference to the entity is further based at least partly on the score.

20. The computer-implemented method of claim 5, further comprising:
determining that the first subset corresponds to a first string in an entity lexicon, wherein the first string represents the entity; and
determining that the first subset corresponds to a second string in the entity lexicon, wherein the second string represents a second entity, and wherein the first string is longer than the second string;
wherein the identifying the first subset as the reference to the entity is further based at least partly on the first string being longer than the second string.

21. The computer-implemented method of claim 5, further comprising determining to exclude the third subset from the search terms based at least partly on the second frequency being greater than a third frequency, wherein the third frequency is the frequency with which at least a third token of the third subset occurs with the first token in the plurality of previously submitted search queries.

22. Non-transitory computer-readable storage comprising executable code that, when executed, causes one or more computing devices to perform a process comprising:
generating a transcription of at least a portion of an utterance, wherein the transcription comprises a sequence of tokens corresponding to at least a portion of a search query;
identifying a first subset of the sequence of tokens as a reference to an entity in the transcription based at least partly on a first frequency with which at least a first token of the first subset occurs in a plurality of previously submitted search queries;

identifying a second subset of the sequence of tokens as a reference to an attribute of the entity in the transcription based at least partly on a second frequency with which at least a second token of the second subset occurs with the first token in the plurality of previously submitted search queries, wherein the second token occurring with the first token comprises the second token and first token both occurring in a same search query of the plurality of previously submitted search queries;

generating search terms using the reference to the entity and the reference to the attribute, wherein the search terms include the first subset and second subset, and wherein the search terms exclude a third subset of the sequence of tokens; and generating search results responsive to the search query by identifying an item in a product catalog using the search terms, wherein the product catalog indicates the item comprises an instance of the entity having the attribute.

23. The non-transitory computer-readable storage of claim 22, wherein generating the search results using the search terms is performed in response to determining that searching the product catalog using the search query returns no results.

24. The non-transitory computer-readable storage of claim 22, wherein identifying the second subset as the reference to the attribute comprises identifying, within an attribute lexicon, a token of the transcription.

25. The non-transitory computer-readable storage of claim 22, the process further comprising using a statistical model to generate a marked-up transcription comprising indicators of entity boundaries and attribute boundaries.

* * * * *